UNITED STATES PATENT OFFICE.

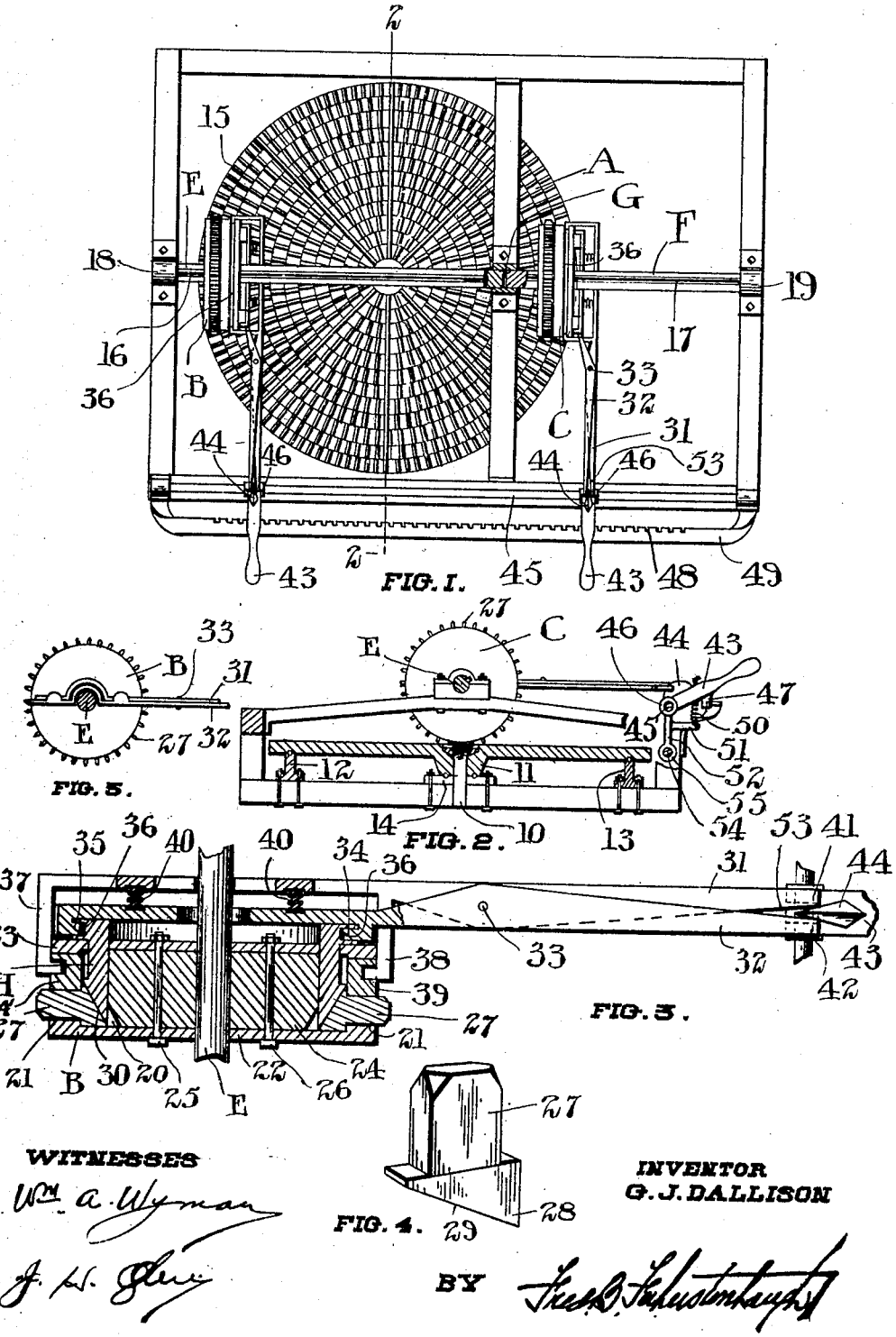

GEORGE JOSEPH DALLISON, OF OTTAWA, ONTARIO, CANADA.

VARIABLE-SPEED GEAR.

No. 913,623.   Specification of Letters Patent.   Patented Feb. 23, 1909.

Application filed April 4, 1908. Serial No. 425,095.

*To all whom it may concern:*

Be it known that I, GEORGE JOSEPH DALLISON, of the city of Ottawa, in the county of Carleton, Province of Ontario, Canada, have invented certain new and useful Improvements in Variable-Speed Gears, of which the following is a specification.

My invention relates to improvements in variable speed gears of the type in which adjustable pinions operate on a disk wheel having concentric sets of teeth thereon and the objects of my invention are to provide improved means for enabling the transfer of the pinions to be quickly and effectively made from one set of teeth to the next; and it consists essentially in the pinions having retractable teeth and the means for permitting the retraction of the teeth moving them outwardly and adjusting the pinions in position, all as hereinafter more fully set forth and described in detail in the accompanying specification and drawings.

In the drawings, Figure 1 is a plan view of the gear. Fig. 2 is a section on the line 2—2, Fig. 1. Fig. 3 is an enlarged horizontal section through one of the pinions. Fig. 4 is an enlarged perspective detail of one of the pinion teeth. Fig. 5 is a detail side view of one of the pinions.

In the drawings, like characters of reference indicate corresponding parts in each figure.

Referring to the drawings, A represents the toothed disk wheel supported in any desirable manner, as, for instance, by the step shaft 10 entering the hub 11, and ball bearings 12, 13 and 14, on which the weight of the disk wheel is supported. The disk wheel is formed on its upper surface with a number of concentric sets of teeth 15 of equal pitch and which may either be cast integral with the disk or separately from and secured thereto.

B and C represent the pinions operating on the disk connected respectively to shafts E and F, each having a common bearing G for their abutting ends, which bearing is located to one side of the center of the disk as shown. The connection between each pinion and its respective shaft is such that the pinion wheel rotating with the shaft may slide longitudinally thereon. This, in the embodiment illustrated, is accomplished by the well known expedient of forming feathers 16 and 17 on the shaft, engaging corresponding grooves provided in the pinions. The outer ends of the shafts E and F are supported by bearings 18 and 19 and the shafts themselves may be connected in any desired way, with the apparatus or mechanism in which the gear is to be used. To enable the pinions to be moved easily from one set of concentric teeth to the other, the teeth of the pinions are formed retractable and releasable means are provided for locking them in their outermost position. Referring, then, particularly to Figs. 3, 4 and 5, it will be seen that each pinion is formed with an annular recess 20, which communicates with the radial recesses 21 within which the teeth are slidably held. The recesses 20 may be formed in the pinion in any desired manner, and in the particular construction illustrated, the pinion is formed with two outer plates 22 and 23, and a central hub 24 all connected together by bolts 25 and 26. Each of the pinion teeth 27 is formed with a base portion 28 having an inclined surface 29 formed thereon, and within the recess 20 a movable locking member H is provided having an inclined surface 30 provided thereon, adapted to co-act with the inclined surfaces 29 on the teeth, to actuate the same outwardly and retain them in outermost position. In the specific embodiment illustrated, this member H is in the form of an annulus, and its movement is substantially in the direction of the axis of the pinion. To release and lock the teeth, it is necessary to produce a relative movement between the locking member and the pinion proper, and this is accomplished, in the embodiment illustrated, by two levers 31 and 32 centrally pivoted to each other at 33, and which have their ends connected respectively to the movable member and to the pinion. Thus the upper lever 32 is connected to the movable member H by means of projecting arms 34 and 35, which extend into an annular groove 36 on the movable member, while the under lever 31 is connected to the pinion by means of arms 37 and 38, which extend into an annular groove 39 on the exterior of the pinion. The movable member is preferably retained in locking position by means of springs 40 extending between the inner ends of the levers 31 and 32 and normally holding the said ends apart. The two levers 31 and 32 are so pivoted that when their outer extremities 41 and 42 are moved apart the inner extremities will be caused to close, thereby effecting the withdrawal of the removable member and the releasing of the teeth. The opening of these lever ends and the movement to change the position of the pinions is accomplished by hand levers 43, normally remaining in inclined position, having projections 44 thereon with inclined surfaces on opposite sides, which are adapted, when the lever 43 is raised to vertical position, to open the ends 41 and 42 sufficiently to withdraw the locking member H. The levers 43 may be conveniently slidably supported on a cylindrical rod 45 extending parallel with the shafts E and F, and being encircled by sleeves 46 formed on the extremities of the levers 43. The levers 43 are preferably, held in adjusted position, by means of projections 47 engaging the teeth 48 on a longitudinally extending rack 49 suitably supported in position. The levers may be held in engagement therewith by a spring 50 extending between said levers and a projection 51 on an arm 52, the upper end of which extends around the rods 46 and in a slot 53 formed in the sleeve, the lower end of the arm being formed with a short sleeve 55 which extends around a longitudinally extending rod 54. Thus, when it is desired to change the pinion from one set of teeth to the next, the lever 43 corresponding thereto, is raised to vertical position, which opens the ends 41 and 42 of the levers 31 and 32, causing the locking member H to be withdrawn and leaving the retractable teeth free to move inwardly. The lever 43 may thus be slid along the rod 45, moving the pinion with it, through the medium of the levers 31 and 32, the teeth on the pinion freely sliding inward to pass over the teeth of the different rows. It will thus be seen that I have devised exceedingly simple and effective means for both releasing the retractable teeth and adjusting the pinion in position.

As many changes could be made in the above construction, and many apparently widely different embodiments of my invention could be made without departing from the spirit or scope thereof, it is intended that all matter contained in these specifications and drawings shall be interpreted as illustrative and not in a limiting sense; it is also to be understood that the language of the following claims is intended to cover such generic and specific features of the invention herein described, which, as a matter of language, might be said to be included thereby.

What I claim as my invention is:—

1. In a variable speed gear, the combination with the pinion, having a hub, an outer portion rigidly connected thereto, and the retractable teeth in the outer portion, of means operating between the hub and the outer portion for locking the teeth in the outermost portion.

2. In a variable speed gear, the combination with the pinion having a hub, an outer portion rigidly connected thereto and the retractable teeth in the outer portion, of a longitudinally movable annular member operating between the hub and the outer portion and adapted to lock the teeth in outermost position.

3. In a variable speed gear, the combination with the pinion having retractable teeth, of a locking member adapted to lock the teeth in outermost position and a pair of centrally-pivoted levers having their extremities connected respectively to the locking members and the pinions, and adapted, when actuated, to cause relative movement between the same.

4. In a variable speed gear, the combination with a pinion having retractable teeth, a movable locking member adapted to actuate the teeth outwardly and lock them in outermost position, of a pair of levers having their inner ends connected respectively to the movable member and the pinion, and being adapted to withdraw the movable locking member when their outer ends are separated, and means for separating their outer ends.

5. In a variable speed gear, the combination with a pinion having retractable teeth, a movable locking member adapted to actuate the teeth outwardly and lock them in outermost position, of a pair of levers having their inner ends connected respectively to the movable member and the pinion, and being adapted to withdraw the movable locking member when their outer ends are separated, and means for separating their outer ends and moving the levers laterally.

6. In a variable speed gear, the combination with a pinion having retractable teeth, a movable locking member adapted to actuate the teeth outwardly and lock them in outermost position, of a pair of levers having their inner ends connected respectively to the movable member and the pinion, and being adapted to withdraw the movable locking member when their outer ends are separated, and pivoted, laterally-movable levers having projections extending between the ends of the levers adapted to cause separation of said ends when the lever is tilted.

7. In a variable speed gear, the combination with a pinion having retractable teeth, a movable locking member adapted to actuate the teeth outwardly and lock them in outermost position, of a pair of levers having their inner ends connected respectively to the movable member and the pinion, and being adapted to withdraw the movable locking member when their outer ends are separated, pivoted, laterally-movable levers having projections extending between the ends of the levers adapted to cause separation of said ends when the lever is tilted, and releasable means for retaining the lever in locking position.

8. In a variable speed gear, the combination with a pinion having retractable teeth, a movable locking member adapted to actuate the teeth outwardly and lock them in outermost position, of a pair of levers having their inner ends connected respectively to the movable member and the pinion, and being adapted to withdraw the movable locking member when their outer ends are separated, means for separating their outer ends, a rack bar and pivoted, laterally-movable levers having projections extending between the ends of the levers adapted to cause separation of said ends when the lever is tilted, and having a projection adapted to engage the rack bar.

9. In a variable speed gear, the combination with a pinion having retractable teeth, a movable locking member adapted to actuate the teeth outwardly and lock them in outermost position, of a pair of levers having their inner ends connected respectively to the movable member and the pinion, and being adapted to withdraw the movable locking member when their outer ends are separated, means for separating their outer ends, a rack bar, pivoted, laterally-movable levers having projections extending between the ends of the levers adapted to cause separation of said ends when the lever is tilted, and having other projections adapted to engage the rack bar, and spring means for retaining the projection in engagement with the rack bar.

10. In a variable speed gear, the combination with the pinion having retractable teeth formed on their underside with inclined surfaces, of an annular locking member having an inclined surface engaging the inclined surfaces on the teeth adapted to actuate the same outwardly, pivoted levers having their ends connected respectively to the locking member and to the pinion, spring means extending between the two levers adapted to retain them with the locking member in locked position, and means for actuating the levers to release the locking member and adjust the position of the pinion.

In witness whereof I have hereunto set my hand in the presence of two witnesses.

GEORGE JOSEPH DALLISON.

Witnesses:
RUSSEL S. SMART,
CARMEL W. CAMERON.